(No Model.)
A. B. STARKEY.
WHEEL.
No. 433,105. Patented July 29, 1890.
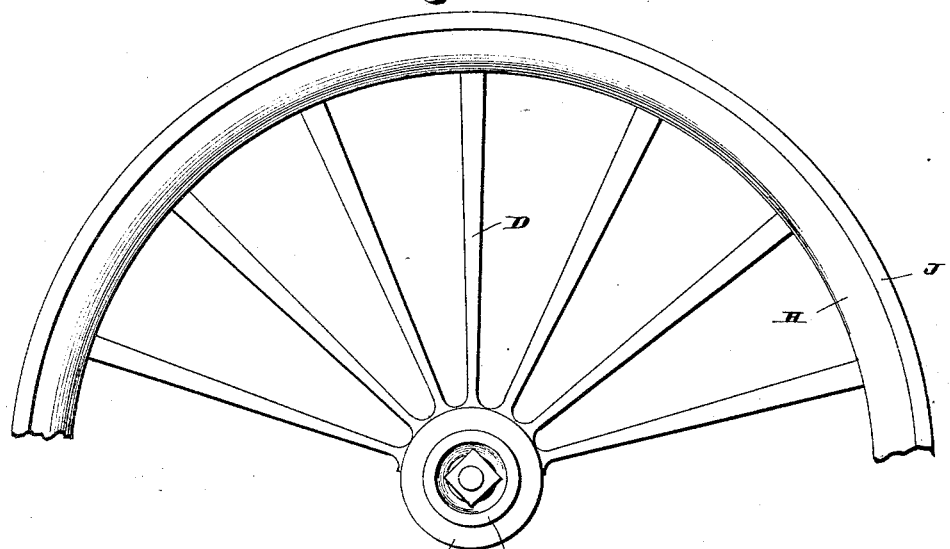
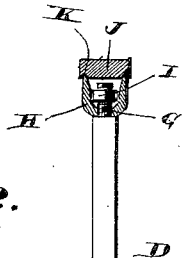
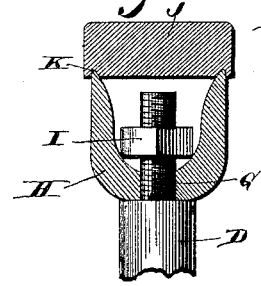
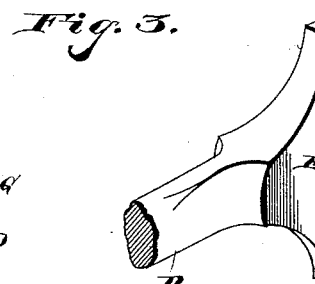
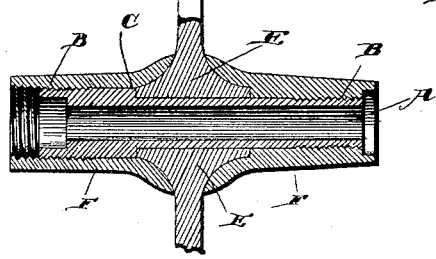
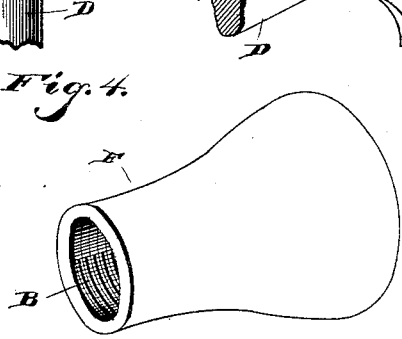
Witnesses
Samuel Kit
N. S. Collamer.
Inventor
Andrew B. Starkey
By his Attorneys
C. A. Snow & Co.
THE NORRIS PETERS CO., PHOTO-LITHO., WASHINGTON, D. C.

UNITED STATES PATENT OFFICE.

ANDREW B. STARKY, OF BENKLEMAN, NEBRASKA.

WHEEL.

SPECIFICATION forming part of Letters Patent No. 433,105, dated July 29, 1890.

Application filed March 21, 1890. Serial No. 344,825. (No model.)

*To all whom it may concern:*

Be it known that I, ANDREW B. STARKY, a citizen of the United States, residing at Benkleman, in the county of Dundy and State of Nebraska, have invented a new and useful Wheel, of which the following is a specification.

My invention relates to improvements in wheels; and it consists in certain novel features hereinafter described and claimed.

In the accompanying drawings, Figure 1 is side view of a portion of a wheel constructed in accordance with my invention, a part of the felly being broken away. Fig. 2 is a vertical section of the same. Fig. 3 is a detail perspective view of the inner end of one of the spokes, and Fig. 4 is a detail perspective view of one of the sleeves composing the hub. Fig. 5 is an enlarged section of the spoke-attaching devices.

In carrying out my invention I employ an axle-box A, which is mounted on the spindle in the usual manner and is provided with screw-threaded ends, as shown at B, the inner end being of a slightly-greater diameter than the outer end, thereby providing the annular shoulder C. The spokes D are provided at their inner ends with integral T-heads E, which bear upon the axle-box A and have one end resting against the annular shoulder C thereof, so that the spokes will radiate from the axle-box in the same diametrical plane. The said T-heads E are expanded somewhat laterally, so that they bear against each other, and thereby brace each other around the axle-box. The spokes are held on the axle-box by the sleeves F F, composing the hub, which are provided with internal screw-threads to engage the threaded ends of the axle-box and have their inner ends flared, so as to fit over the ends of the T-heads of the spokes, and thereby secure the spokes in position.

The spokes are provided at their outer ends with threaded tenons G, which are inserted into the U-shaped felly H and have nuts I mounted thereon, which are adapted to be turned up against the felly to secure it on the spokes. The tire J is provided in its inner side with the longitudinal grooves K K, which engage the edges of the felly and thereby prevent the tire slipping laterally from the felly. The tire is shrunk on the felly in the usual manner.

From the foregoing description, taken in connection with the accompanying drawings, it will be seen that I have provided a wheel which is simple in its construction, which can be easily and cheaply manufactured, and which is strong and durable. The construction of the felly is such that the ends of the spokes will be completely inclosed and the securing-nuts hidden from sight, while the grooves in the tire engaging the edges of the felly effectually prevent the tire slipping off the wheel. The sleeves F F, composing the hub, can be readily secured in position, and when in position will effectually retain the spokes in their proper place. Should one of the spokes be broken, the sleeve can be readily removed, so as to permit the removal of the broken spoke and the insertion of a new one. The T-head construction of the inner end of the spoke also gives it an increased bearing against the axle-box, so that greater strength will be possessed by the wheel.

Having thus described my invention, what I claim, and desire to secure by Letters Patent, is—

1. In a wheel, the axle-box A, having its inner end enlarged and provided with a shoulder C and end screw-threads B, in combination with the spokes D, having T-headed inner ends E, the inner extremities of which heads are of the same thickness as said shoulder against which they abut, and sleeves F F, screwed on said threads and having flaring inner ends embracing the extremities of said T-headed ends, substantially as described.

2. In a wheel, the axle-box A, having threaded ends B, in combination with the spokes D, having T-headed inner ends E, whose faces stand in radial lines from the center of said box, and sleeves F F, screwed on said threads and having flaring inner ends embracing the extremities of said T-headed ends, substantially as described.

3. In a wheel, the axle-box A, having its inner end enlarged and provided with a shoulder C and end screw-threads B, in combination with the spokes D, having T-headed inner ends E, whose faces stand in radial lines from the center of said box, the inner extremities of which heads are of the same thickness as said shoulder, against which they abut, and sleeves F F, screwed on said threads and having flaring inner ends embracing the extremities of said T-headed ends, substantially as described.

In testimony that I claim the foregoing as my own I have hereto affixed my signature in presence of two witnesses.

ANDREW B. STARKY.

Witnesses:
JOHN L. REMALEY,
WILLIAM COY.